April 14, 1964 P. BALABAN 3,129,326

RESET OPERATIONAL AMPLIFIER

Filed Nov. 21, 1961 2 Sheets-Sheet 1

Philip Balaban
INVENTOR.

BY Michael P. Breston

AGENT

Philip Balaban
INVENTOR.

BY Michael P. Breston

AGENT

United States Patent Office 3,129,326

Patented Apr. 14, 1964

3,129,326

RESET OPERATIONAL AMPLIFIER

Philip Balaban, Colonia, N.J., assignor to Computer Systems, Inc., Monmouth Junction, N.J., a corporation of New York Filed Nov. 21, 1961, Ser. No. 154,402
9 Claims. (Cl. 235—183)

This invention generally relates to computer systems and more specifically to amplifying systems for use in analog computers.

In an analog computer, the variables of the problem to be solved are represented by corresponding voltage or "machine" variables. In D.C. analog computers, the machine variables are D.C. voltages which may vary with time. In the solution of differential equations, time is usually taken as the independent variable. The machine variables are typically derived from "computing elements," the most widely used of which are formed of direct-coupled (D.C.), sign-inverting, high-gain, feedback amplifiers. The amplifiers' feedback and input impedances are usually formed from resistors and capacitors. Conveniently, the parameter values and the coefficients prescribed by the problem to be solved are often selected by means of adjustable potentiometers.

In the operation of analog computers, at least three operating conditions or "modes" may be distinguished: the Operate, the Reset and the Hold modes. During the Reset mode (i.e., prior to $t=0$), the machine variables are set to their initial values which are generally impressed upon the feedback or computing capacitors. The Reset mode is terminated when the voltages across the computing capacitors reach their assigned initial values. When it is desired to store prior to ($t=0$) some initial condition values for use in subsequent computer runs, the corresponding capacitors holding such values are placed in the Hold mode. In this mode, the capacitors perform a storage or memory function. At the initiation of the computer run, i.e., at $t=0$, the remaining capacitors are placed in the Operate mode thereby causing the machine variables to change in accordance with the terms of the specified equations. The changing machine variables may be visually observed on suitable oscillographs or permanently recorded on plotting boards, recorders, etc.

In past efforts, the computing elements were switched from one mode to the other by means of mechanical switches such as relay contacts. To increase the switching speed, attempts were also made to employ electronic switches. In general, prior art switches were undesirably limited in one or more of the following respects: (1) insufficient switching speed, (2) unreliable operation, (3) too high conduction resistance, (4) non-linearity, and (5) incomplete isolation between the Operate and Reset circuits.

Accordingly, it is a general object of the present invention to provide new and improved computing amplifier systems which largely overcome the enumerated limitations of prior art devices.

It is another object of this invention to provide new and improved computing amplifier systems including electronic switching systems which are particularly adapted for controlling the application of input signals to operational amplifiers.

These and other objects are attained in accordance with the invention by providing in an analog computing system, having an input terminal for receiving information signals and a reset terminal for receiving predetermined initial condition signals, an operational amplifier including a first feedback impedance connected between the amplifier's output and input, a second feedback impedance and a reset impedance connected in series between the amplifier's output and the reset terminal, the junction between said second feedback impedance and said reset impedance forming a reset summing junction for the amplifier's output signals and the initial condition signals, a T-type switching system, and means connecting said switching system between said reset summing junction and the amplifier's input.

The invention will be better understood from the following detailed description when taken in conjunction with the accompanying drawings, wherein.

Figure 1:
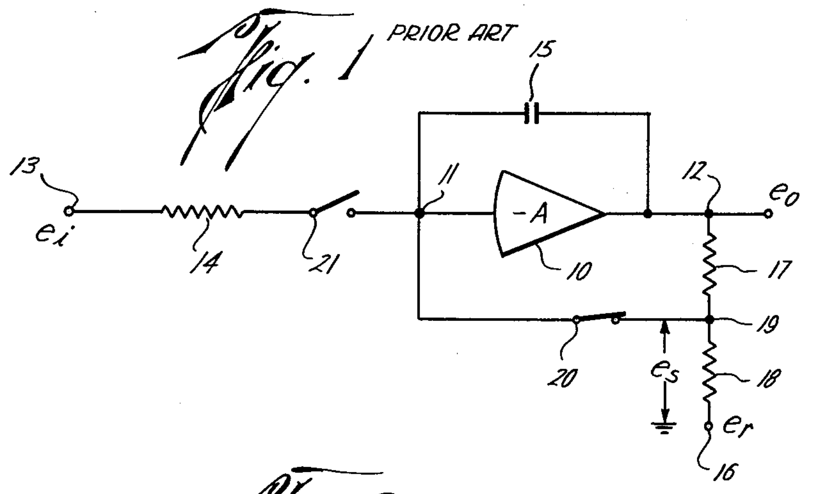
FIG. 1 is a schematic diagram of a typical prior art computing system.

In FIG. 1 is shown a typical prior art computing amplifier system arranged for providing an output signal $e_0$, which is the integral of an input signal $e_1$, and for acquiring an initial condition or reset voltage $e_r$.

The computing system comprises a high-gain, sign-inverting amplifier 10 having an input terminal 11 and an output terminal 12. Amplifier 10 may be of conventional, direct-coupled (D.C.) design, incorporating automatic drift stabilization, if desired. The input signal $e_1$, which may be constant or time varying, is applied to the computer's input terminal 13, connected to the amplifier's input terminal 11 via a high-valued input resistor 14 and an isolation switch 21. A feedback impedance, typically a capacitive network such as 15, is connected between output terminal 12 and input terminal 11. To allow the computer to acquire the reset voltage $e_r$, applied to the reset input terminal 16, there is typically provided a high-valued feedback resistor 17 and an equally valued reset resistor 18. Resistors 17 and 18 are connected in series between terminals 12 and 16. Their junction 19 forms a reset summing point for the output signal $e_0$ and the reset signal $e_r$. The weighted algebraic average signal $e_s$ (relative to ground), appearing on the summing junction 19, is coupled to the amplifier's input terminal 11 via an isolation switch 20. A more complete description of the prior art computing system may be found in section 7.1 of the text "Electronic Analog Computers" by Korn and Korn (second edition, 1956, McGraw-Hill Book Company).

A yet fuller understanding of the prior art computing system and its inherent limitations may be gained by assigning typical values to the components of FIG. 1. These are: $R_{17}=R_{18}=.1$ megohm (which causes $e_s$ to be at substantially ground potential and $e_0=-e_r$), $R_{14}=1$ megohm, $C=0.01$ microfarad, and the amplifier's gain ($-A$) may range from $10^3$ to $10^9$. The sign-inverting action of amplifier 10 may be obtained by using an odd number of amplifying stages. Typically, isolation switches 20 and 21 are of the electro-mechanical type such as relays.

If isolation switches 20 and 21 are assumed to be ideal, then when their terminals are alternately closed and open they will respectively afford zero forward resistance and infinite isolation resistance.

In FIG. 1 the computer is in its Reset mode, i.e., switch 21 is Off and switch 20 is On. The time required for the output voltage $e_0$ to reach the value of the reset voltage $e_r$ depends upon the time constant afforded by the product $R_{17}C_{15}$. The total resetting time for the computer may be taken as ten times the product $R_{17}C_{15}$, or a total time of 0.01 second. If it were desired to speed-up the operation of the computer by curtailing this total resetting time, the computer would start operating from an incorrect initial condition value, thereby introducing appreciable errors to the problem's solutions in dependence upon the magnitude of the curtailment. A complete compute or integrate cycle consists of an Operate and a Reset period. Taking into consideration the time required for the Operate period, there is imposed a limit on repetitive resetting of approximately 25 cycles per second. Although prior art systems may have achieved repetition rates as high as 100 c.p.s., such rates were obviously accomplished to the detriment of the computer's accuracy.

Although a total resetting time period of 0.01 second may appear to be a short time interval, for many applications such a waiting period is too long. In the solution of many varied problems, it is often required for the resetting period to be on the order of microseconds, say 100 microseconds or less. Given such relatively short resetting time intervals, it is found that the time required for the output signal $e_0$ to reach the value of the resetting signal $e_r$ is no longer limited by the $R_{17}C_{15}$ time constant but rather by the amplifier's rise time. A typical rise time value is 1 volt per microsecond.

Figure 2:
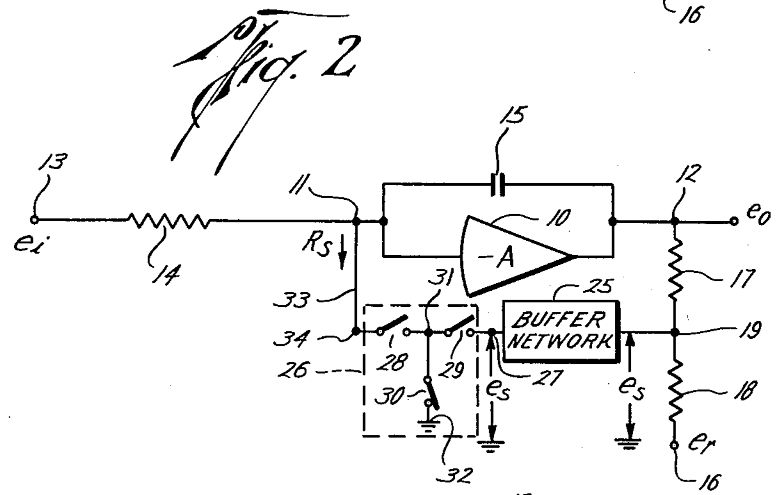
FIG. 2 is a schematic diagram of a computing amplifier system in accordance with the invention, the computer being in its Operate mode.

In FIG. 2 is shown a computer system in its Operate mode in accordance with this invention which will effectively provide the desired short resetting time intervals without impairing the isolation between signals $e_i$ and $e_s$. For the sake of simplicity of the figures, those components which perform similar functions bear the same reference numerals.

In FIG. 2, between summing point 19 and the amplifier's input terminal 11, there is now connected a buffer network 25 and a T-type switching system 26. The buffer network's input impedance as seen from junction 19 is very high and its output impedance looking into its output terminal 27 is relatively very low, and may be on the order of only 50 ohms or less.

Figure 3:
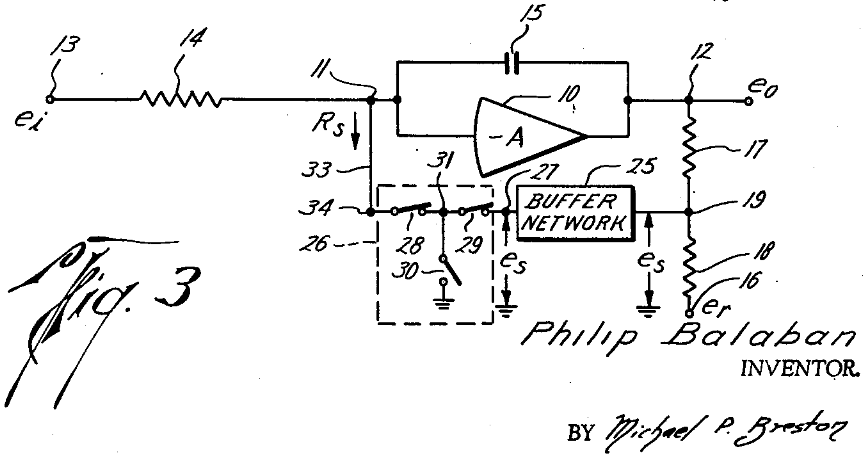
FIG. 3 is a schematic diagram of the computing amplifier system of FIG. 2 when in its Reset mode.

Switching system 26 has a T-configuration and includes two series connected circuit breakers or switches 28 and 29, connected to a common junction 31, and a shunt switch 30 connected between junction 31 and ground 32. The output terminal 34 of the switching system 26 may be connected to the amplifier's input terminal 11 by a conductor 33. Each of switches 28–30 should have a very low forward resistance, on the order of only a fraction of an ohm to 10 ohms, and a relatively high isolation resistance, on the order of 10 megohms or more. Whereas FIG. 2 shows the computer in its Operate mode, i.e., switches 28, 29 are Off and switch 30 is On, FIG. 3 shows it in its Reset mode, i.e., series-arm switches 28 and 29 are On and the shunt arm switch 30 is Off.

In an illustrative operation of the computer in accordance with this invention, the weighted algebraic average signal $e_s$ appears on the summing point 19, as described in conjunction with the operation of the computer of FIG. 1. The gain of the buffer network 25 is preferably +1 so that the signal $e_s$ appears substantially unaltered at the input terminal 27 to the switching system 26. Since the output impedance of the buffer network 25 is made to be very low and the forward resistance of switches 28, 29 is also very low, it is clear that during the Reset mode the total resistance $R_s$ looking into the output terminal 34 of the switching system 26 is also very low, say on the order of 50 ohms or less.

During the Reset period, therefore, the output signal $e_0$ now reaches the value of $-e_r$ in a time interval determined by the reset-time-constant $R_sC_{15}$. Consequently, because of the low value of $R_s$, the reset-time-constant is now measured in microseconds. Therefore, the output voltage $e_0$ now follows substantially instantaneously the resetting voltage ($-e_r$). As a corollary, voltage $e_s$, at the summing point 19, also substantially instantaneously reaches an extremely low value very near to ground potential.

It should be noted that although switch 21 was required in the prior art computer shown in FIG. 1 in order to isolate signals $e_i$ and $e_s$, this switch may be omitted from the computer of FIG. 2 in accordance with an inherent advantage of this invention. That switch 21 can be omitted without impairing the isolation between signals $e_i$ and $e_s$ may be seen from the following: In FIG. 3, the computer's integrating time constant (as determined by the product of capacitor 15 and resistor 14) is much higher than the resetting time constant (as determined by the product of capacitor 15 and resistance $R_s$), consequently, the contribution of the incoming signal $e_i$ to the output signal $e_0$ during the very short Reset period is negligible. It remains to be shown that in FIG. 2 the contribution of the reset signal $e_r$ to the output signal $e_0$ during the Operate period is also negligible.

During the computer's Operate period the isolation resistance of switch 29 is relatively very high, say on the order of $10^6$ ohms or more, and the forward resistance of switch 30 is relatively very low, on the order of 10 ohms or less, hence, switches 29 and 30 act as a voltage divider network for signal $e_s$ appearing at the output terminal 27 of the buffer network 25. Consequently, the portion of signal $e_s$ appearing at the T-junction 31 is negligible. As a corollary, the contribution of the resetting signal $e_r$ to the incoming signal $e_i$ at the summing point 11 is also negligible. Also, since the open circuit impedance of switch 28 is much higher than the amplifier's input impedance looking into terminal 11, it follows that switch 28 presents a negligible load on the input signal $e_i$.

In sum, during the Operate mode, the computer acts as an integrator wherein the switching system 26 efficiently isolates the initial-condition setting circuit from the integrating circuit. The period of integration being dependent, as in FIG. 1, upon the integration time constant $R_{14}C_{15}$.

Figure 4:
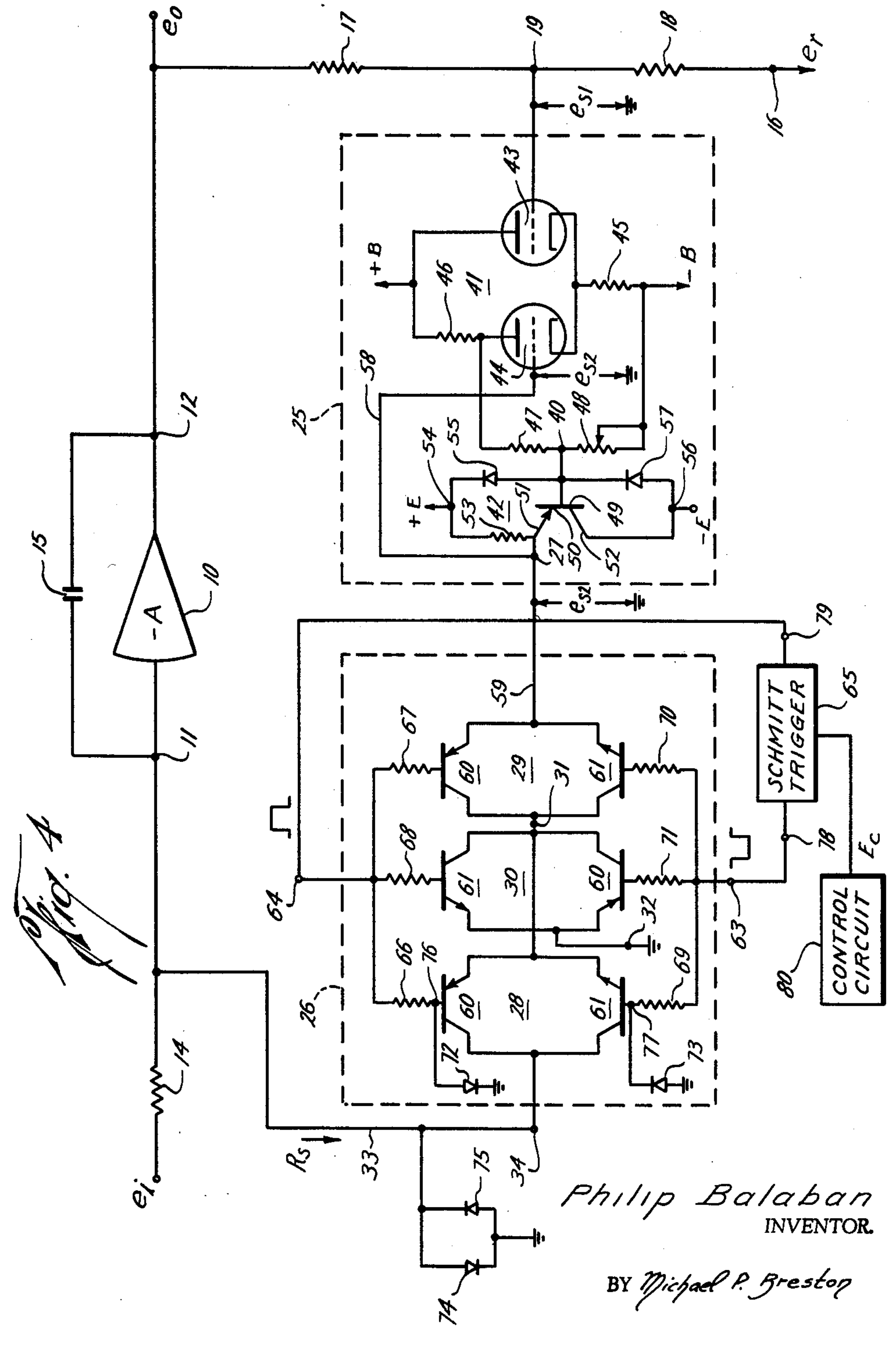
FIG. 4 is a preferred circuit diagram of the computing amplifier system of FIG. 2.

In FIG. 4 is shown a preferred embodiment of the buffer network 25 and of the T-type switching system 26.

The buffer network 25 includes a difference amplifier 41 followed by an emitter-follower stage 42. Amplifier 41 comprises a double-triode 43, 44 whose cathodes are coupled to the −B voltage supply via a common cathode resistor 45. The B+ supply is connected to the plate of triode 44 through a load resistor 46. The plate of triode 43 is directly connected to the +B supply, as shown. The output signal of amplifier 41 is taken from junction 40 which is connected to the plate of triode 44 via a resistor 47 and to the −B terminal via a potentiometer 48. The wiper on potentiometer 48 is set so that the potential at junction 40 is zero when the summing junction 19 is at substantially ground potential.

Junction 40 is connected to the base 49 of a PNP transistor 50 arranged into an emitter-follower stage. Emitter 51 is connected to base 49 via load resistor 53, junction 54 and diode 55. Collector 52 is connected to base 49 via junction 56 and diode 57. Junctions 54 and 56 are respectively connected to the +E and −E terminals of a low voltage source. As can be seen from the polarity of diodes 55 and 57, the signal appearing at junction 40 is limited substantially to ±E volts, thereby protecting transistor 50. The emitter-follower's output signal is taken from junction 27 which is directly connected to the grid of triode 44 via a conductor 58 and to the input of the electronic switching system 26 via a conductor 59.

The electronic switching system 26 has a T-configuration and includes two series arm switches 28 and 29 and a shunt arm switch 30. Each of switches 28–30 includes a PNP transistor 60 and an NPN transistor 61. The emitter electrodes of each pair of transistors are interconnected. Similarly, the collector electrodes of each pair are also interconnected, as shown. To energize the switching system 26, terminals 63 and 64 receive energizing signals, preferably two level signals. Terminal 64 is connected to the base electrodes of the PNP transistors 60 of switches 28, 29 via current limiting resistors 66, 67, and to the base electrode of the NPN transistor 61 of switch 30 via current limiting resistor 68. Similarly, terminal 63 is connected to the base electrodes of the NPN transistors 61 of switches 28, 29 via current limiting resistors 69, 70, and to the base electrode of the PNP transistor 60 of switch 30 via current limiting resistor 71. The collector electrodes of switches 29 and 30 are connected to the T-junction 31. The emitter electrodes of switch 30 are connected to grounded terminal 32.

The amplifier's input terminal 11 is connected to the collector electrodes of switch 28 which is coupled to junction 34 via conductor 33. The polarities of diodes 72, 73 are such as to prevent the potential at terminal 76 from reaching a value above ground and the potential at terminal 77 from reaching a value below ground potential. Also, to protect the transistors 60, 61 of switch 28, should amplifier 10 become overloaded, a pair of oppositely poled diodes 74, 75 are connected in parallel between the switching system's output terminal 34 and ground.

To energize the switching system 26, a multivibrator 65, such as Schmitt type trigger circuit, is provided having output terminals 78, 79 respectively connected to terminals 63, 64 for supplying thereto opposite polarity pulses. The Schmitt circuit flops from one stable state to the other in response to a control signal $E_c$ derived, for example, from a suitable control circuit 80.

In the preferred operation of the embodiment of FIG. 4, the initial condition signal $e_r$ is applied to terminal 16. The weighted algebraic average signal $e_{s1}$ appears at the reset summing point 19. Since triode 43 is connected as a cathode follower, its relatively high input impedance presents a negligible load to the resetting signal $e_r$. The grid electrode of triode 43 receives the signal $e_{s1}$. Because of the cathode follower action, $e_{s1}$ also appears substantially unaltered on the cathode of triode 43. Let $e_{s2}$ be the signal referenced to ground at the output terminal 27 of the emitter-follower stage 42.

If $e_{s2}$ were not substantially equal to $e_{s1}$, the difference signal $e_{s2}-e_{s1}$, after being detected by the difference amplifier 41, would appear at junction 40 and also, because of the emitter-follower 42, at output terminal 27 from which it would be fed back degeneratively to the grid of triode 44. The signal fed back would be amplified by triode 44 by an amount tending to make $e_{s2}$ substantially equal to $e_{s1}$. The preceding steps occur substantially instantaneously. Since $e_{s2}$ is maintained equal to $e_{s1}$, it follows that the gain of the buffer network 25 is +1. Also, since the output stage of the buffer network is an emitter-follower circuit, the output impedance looking into terminal 27 is very low, on the order of 50 ohms or less. Signal $e_{s2}$ is applied to the switching system 26.

The main functions of the T-type switching system 26 are: (1) to prevent the output current from the emitter-follower stage 42, during the Operate mode, from reaching capacitor 15, (2) to substantially instantaneously apply this output current to capacitor 15 during the Reset mode, and (3) to effectively isolate the resetting and integrating circuits.

During the Operate mode, the Schmitt trigger circuit 65 applies a negative pulse to terminal 63 and a positive pulse to terminal 64. Consequently, switches 28 and 29 are Off and switch 30 is On. That this is so may be readily visualized by remembering that a PNP transistor is in the open circuit condition when its base electrode is more positive than either its collector or emitter electrode and, inversely, an NPN transistor is in the open circuit condition when its base electrode is less positive than either its collector or emitter electrode.

When PNP transistor 60 and NPN transistor 61 of switch 30 are in their conducting states, the potential on their collectors corresponds substantially to the potential on their emitters, namely, ground potential. Thus during the Operate mode, shunt switch 30 affords a very low impedance path between terminals 31, 32 and, hence, any current which might flow out from buffer network 25 will become shunted to ground through switch 30.

Moreover since, during the Operate period, switch 28 has a relatively high isolation resistance between its emitter and collector electrodes, it follows that the current supplied by the incoming signal $e_1$ charges primarily capacitor 15 and only a negligible amount thereof leaks through terminal 34.

The function of switch 29 is to effectively isolate the signal $e_{s2}$, appearing at output terminal 27, from the T-junction 31. Without such isolation, $e_{s2}$ would be applied to the amplifier's input terminal 11 through the isolation resistance of switches 28 and 29, each of which has the same order of magnitude as the input resistor 14. It will be readily appreciated that without switches 29 and 30 the computer's accuracy of integration would become greatly impaired, i.e., terminal 11 would in effect become a summing point for signals $e_1$ and $e_{s2}$.

During the Reset mode, in response to the control signal $E_c$, the Schmitt trigger circuit flops stages thereby making the polarity of the pulses appearing at terminals 63 and 64 opposite to those shown in FIG. 4, that is, the pulse at terminal 63 is positive and at terminal 64 negative. Consequently, switches 28 and 29 are On and switch 30 is Off.

It will be appreciated that each of switches 28–30 is provided with a PNP and an NPN transistor in order to make each switch conduct current equally well in both directions, i.e., currents of both polarities can readily flow therethrough. Thus, current of one polarity can flow from terminal 27 to terminal 34 through the emitter-collector of the PNP transistor 60 of switch 29, the junction 31, and the emitter-collector of the PNP transistor 60 of switch 28. Inversely, currents of the opposite polarity can flow from terminal 27 to terminal 34 through the NPN transistor 61 of switch 29, the junction 31, and the NPN transistor 61 of switch 28. In sum, switching system 26 effectively couples the reset voltage $e_r$ to the amplifier's input terminal 11.

Since during the Reset period the total resistance $R_s$ looking into the switching system 26 from terminal 11 is very low, the time interval required for capacitor 15 to become fully charged to the value of the resetting signal $e_r$ is on the order of miscroseconds. In practice, it was found that the resetting time interval is limited by the rise time of amplifier 10 rather than by the time constant $R_sC_{15}$.

To merely illustrate typical component values employed in the preferred embodiment of FIG. 4, the following set of parameters is given:

| | |
|---|---|
| Double triode **43**, **44** | Tube 12AT7. |
| Resistor **46** | 6.8K. |
| Resistor **45** | 27K. |
| Resistor **47** | 12K. |
| Potentiometer **48** | 18K. |
| Diodes **55**, **57** and **72–75** | HB2. |
| Transistor **50** | 2N1193. |
| Resistor **53** | 330 ohms. |
| B source | ±100 volts. |
| ±E source | ±6 volts. |
| Transistors **60** of switches **29**, **30** | 2N315A. |
| Transistors **61** of switches **29**, **30** | 2N356A. |
| Transistor **60** of switch **28** | 2N1220. |
| Transistor **61** of switch **28** | ST45. |
| Resistors **67** and **70** | 15K. |
| Resistors **68** and **71** | 100K. |
| Resistors **66** and **69** | 5.1K. |
| Pulses on terminals **63**, **64** | ±8 volts. |

Various modifications and applications of the principles of the invention will readily occur to those skilled in the art. By utilizing the high order of versatility afforded by the electronic switching system, when used in conjunction with operational amplifiers, various functions such as, for example, the switching in of different gain factors, the repetitive application of signals to the input of the amplifier, etc., can be readily accomplished.

Although the computer of the invention has been described as performing only an integration function, it will be clear that it can be readily made to perform other functions by merely changing the nature of the amplifier's input and feedback impedances. Moreover, if a relatively slow resetting time period is not too objectionable, the buffer network 25 may be omitted.

Accordingly, the invention is not necessarily restricted to the embodiments shown and described but is of a scope defined in the appended claims.

What is claimed is:

1. In an analog computer having a first input terminal for receiving information signals, a second input terminal for receiving initial-condition signals, and an output terminal: a high-gain amplifier connected between said output terminal and an input summing junction, a resistive impedance connected between said first input terminal and said input summing junction, a reactive impedance connected between said output terminal and said input summing junction, a resistive impedance connected between said output terminal and said second input terminal, and a T-type switching system connected between a point on said resistive impedance and said input summing junction for selectively causing said output terminal to become responsive to said information signals and said initial condition signals.

2. A computing amplifier system comprising an operational amplifier having at least one input resistor connected to an input summing point, a first feedback loop including an integrating capacitor connected between an output terminal of said amplifier and said input summing point, a second feedback loop including a feedback resistor, to which a reset input resistor is connected at a reset summing point in said second loop, low impedance source means responsive to the potential at said reset summing point for degeneratively applying a corresponding potential to said input point, and T-type switching means for selectively switching said second loop between operative and inoperative conditions and for substantially removing the effect of the signal applied to said input resistor upon said amplifier when said second loop is in its operative condition.

3. A computing amplifier system comprising an operational amplifier having a first feedback loop including an integrating capacitor and a second feedback loop including a feedback resistor to which an input reset resistor is connected at a reset summing point in said second loop, amplifier means having a high input impedance and a low output impedance responsive to the potential at said reset summing point for degeneratively applying a corresponding potential to the input of said amplifier, and T-type switching means for selectively switching said second loop between operative and inoperative conditions whereby the output potential of said operational amplifier may be rapidly reset to the value of a potential applied via said input reset resistor.

4. A computing amplifier system comprising an operational amplifier having a first feedback loop including an integrating capacitor and a second feedback loop including a feedback resistor to which an input reset resistor is connected at a summing point and said second loop; impedance transforming means, including a difference amplifier cascaded with a cathode-follower, responsive to the potential at said summing point for degeneratively applying a corresponding potential to said operational amplifier, and T-type switching means for selectively switching said second loop between operative and inoperative conditions.

5. A computing amplifier system comprising: an operational amplifier having at least one input resistor connected to an input summing junction, first and second feedback loops connected between input and output terminals of said amplifier, said first feedback loop including an integrating capacitor, said second feedback loop including a feedback resistor to which a reset resistor is connected at a reset summing point in said second loop, low output impedance source means responsive to the potential at said reset summing point for applying a corresponding potential degeneratively to said input summing junction, and T-type switching means for selectively switching said second loop between operative and inoperative conditions while said input summing junction is connected to said input resistor, the switching rate being such as to make said operative condition relatively short with respect to the time constant for signals applied to said input resistor.

6. A computing amplifier system as defined in claim 5 wherein said T-type switching means includes a semiconductor switch within each of its three branches.

7. The computing amplifier system as defined in claim 6 wherein each semi-conductor switch is formed of a pair of opposite polarity transistors.

8. The computing amplifier system as defined in claim 6 wherein the leg branch of said T-type switching means is connected to ground potential.

9. A computing amplifier system comprising: an operational amplifier having a first feedback loop including an integrating capacitor, a second feedback loop including a feedback resistor to which a reset resistor is connected at a summing point in said second loop, and switching means for selectively switching said second loop between operative and inoperative conditions, said switching means acting as a low impedance network during said operative condition and as a voltage divider network during said inoperative condition.

References Cited in the file of this patent

UNITED STATES PATENTS

| | | |
|---|---|---|
| 2,750,110 | Och | June 12, 1956 |
| 2,789,761 | Merrill et al. | Apr. 23, 1957 |
| 2,864,961 | Lohman | Dec. 16, 1958 |
| 2,891,725 | Blumenthal et al. | June 23, 1959 |
| 2,962,603 | Bright | Nov. 29, 1960 |
| 2,982,868 | Emile | May 2, 1961 |

OTHER REFERENCES

Diamantidas: "A Multipurpose Electronic Switch for Analog Computer Simulation and Autocorrection Applications," IRE Trans. on Elec. Computers, December 1956, pp. 197–202.